(12) United States Patent
Pascolini

(10) Patent No.: US 6,848,009 B2
(45) Date of Patent: Jan. 25, 2005

(54) NETWORK INTERFACE DEVICE

(75) Inventor: Enrico Pascolini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 09/777,208

(22) Filed: Feb. 5, 2001

(65) Prior Publication Data
US 2002/0069300 A1 Jun. 6, 2002

(30) Foreign Application Priority Data

Oct. 14, 2000 (GB) .............................. 0025297

(51) Int. Cl.[7] .............................................. G06F 15/16
(52) U.S. Cl. ...................................... 709/250; 710/11
(58) Field of Search ................................. 709/217, 220, 709/222, 225, 230, 250; 713/1; 710/8, 10, 11; 370/241, 252, 254–258, 449–454, 465

(56) References Cited

U.S. PATENT DOCUMENTS 5,497,460 A * 3/1996 Bailey et al. .................. 714/39
5,574,722 A * 11/1996 Slykhouse et al. ........... 370/257
6,072,803 A * 6/2000 Allmond et al. ............. 370/445
6,161,134 A * 12/2000 Wang et al. ................. 709/220
6,216,170 B1 * 4/2001 Giovannoni et al. ........ 709/250
6,504,851 B1 * 1/2003 Abler et al. ................. 370/466

* cited by examiner

Primary Examiner—Fritz Fleming
Assistant Examiner—David Martinez
(74) Attorney, Agent, or Firm—Gerald R. Woods

(57) ABSTRACT

A network interface device (150) for connecting a computer (100) to a network (155) includes a port (210) with a plurality of leads for a network communication link (215) and a plurality of functional blocks (225a–225d) each one for operating the device (150) according to a different type of network, each type of network being identified by a corresponding set of active leads; the device (150) further includes logic means (235–245,250–260) for detecting if a signal is present on each lead and for determining the type of network corresponding to the present signals, and configuration means (235–245,230a,230n) for activating the functional block (225a–225d) corresponding to the determined type of network.

4 Claims, 3 Drawing Sheets

NETWORK INTERFACE DEVICE

FIELD OF THE INVENTION

The present invention relates to a network interface device.

BACKGROUND OF THE INVENTION

Network interface devices, also known as network interface cards (or NICs), are commonly used for connecting a computer to a network. A NIC provides a physical connection between a networking cable and an internal bus of the computer; more specifically, the networking cable is terminated by a connector which is plugged into a port of the NIC.

Most NICs are designed for a particular type of network (and respective protocol). Therefore, different NICs must be installed on the computer for attaching the computer to different types of network; this implies high costs, time wastage (for replacing the NIC) or occupation of many expansion slots of the bus of the computer (by different NICs).

A solution known in the art consists in providing the NIC with several ports, each one used for connecting the computer to a different type of network. However, this solution is not particularly satisfactory, in that the multiple ports significantly increase the cost of the NIC. Moreover, each time the computer is connected to a different type of network, the NIC must be re-configured manually through a set-up program or DIP switches. This solution is also error prone, since it is very easy to plug the networking cable into a wrong port.

It has also been proposed to use NICs which can automatically run at different speeds, for example in an Ethernet and in a Fast Ethernet network, or in a half-duplex and in a full-duplex configuration for a Token-ring network. Each time the computer enters the network, the NIC is set to operate in a basic mode (Ethernet or half-duplex). A handshaking process is then carried out with an attached device, such as a switch. If the network supports an advanced mode of operation (Fast Ethernet or full-duplex), the NIC automatically switches to operate accordingly.

However, this solution only supports a single type of network (Ethernet/Fast Ethernet or Token-ring). Therefore, even in this case different NICs must be installed for attaching the computer to different types of network.

It is an object of the present invention to overcome the above mentioned drawbacks. In order to achieve this object, a network interface device as set out in the first claim is proposed.

DISCLOSURE OF THE INVENTION

Briefly, the present invention provides a network interface device for connecting a computer to a network including a port with a plurality of leads for a network communication link and a plurality of functional blocks each one for operating the device according to a different type of network, each type of network being identified by a corresponding set of active leads; the device further includes logic means for detecting if a signal is present on each lead and for determining the type of network corresponding to the present signals, and configuration means for activating the functional block corresponding to the determined type of network.

Moreover, the present invention also provides a computer including the network interface device and a corresponding method for connecting a computer to a network.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
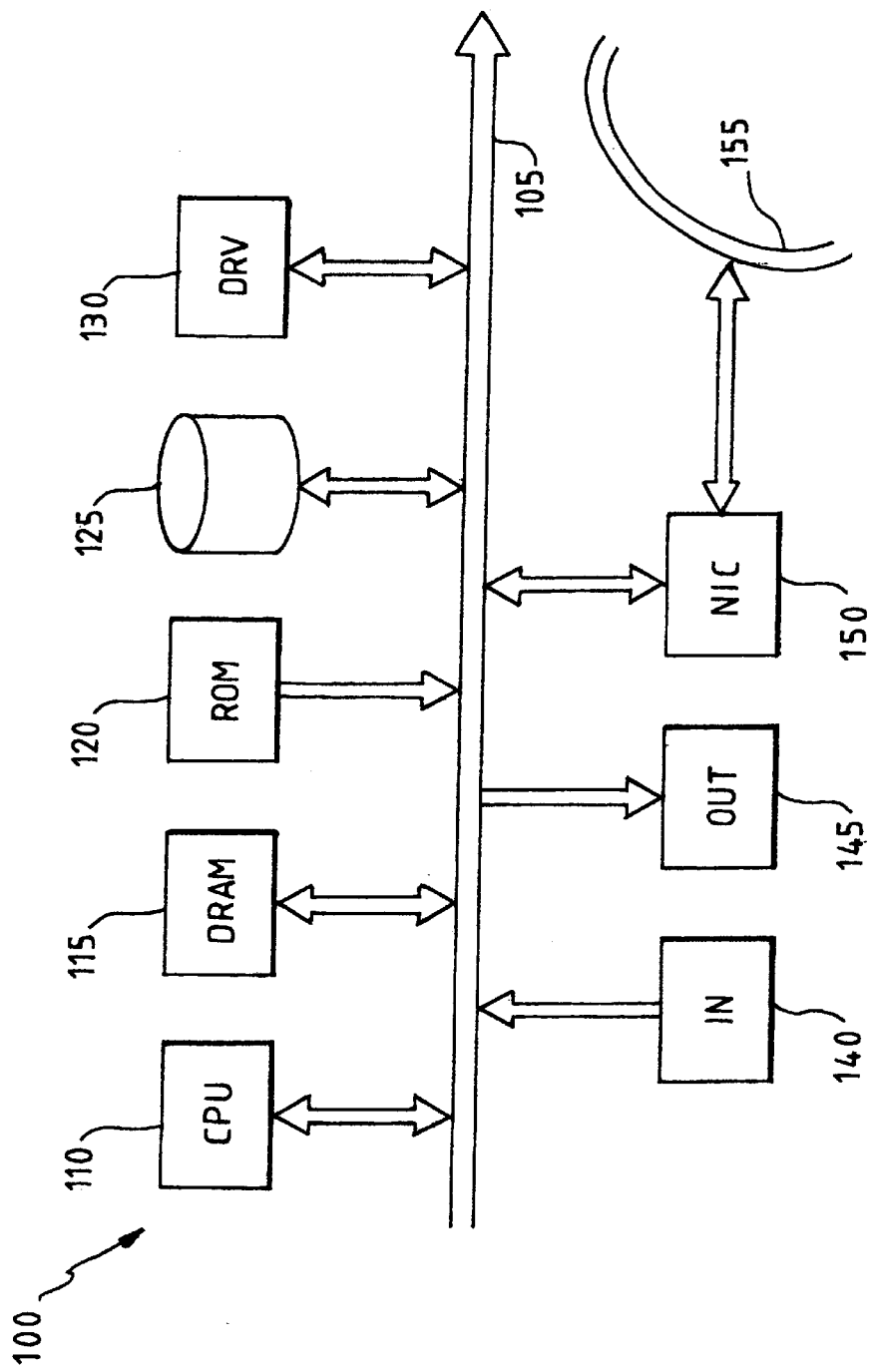
FIG. 1 is a basic block diagram of a computer in which the network interface device can be used.

With reference in particular to FIG. 1, there is shown a computer (or workstation) 100, for example a Personal Computer. The computer 100 has several units which are connected in parallel to a communications bus 105. In particular, a central processor unit (CPU) 110 controls operation of the computer 100, a working memory 115 (typically a DRAM) is used directly by the CPU 110, and a read-only memory (ROM) 120 stores a basic program for starting the computer 100. Various peripheral units are further connected to the bus 105 (by means of respective interfaces). Particularly, a bulk memory consists of a hard disk 125 and of a driver unit (DRV) 130 for reading/writing floppy disks and/or CD-ROMs; the computer 100 further includes an input unit (IN) 140, which consists for example of a keyboard and a mouse, and an output unit (OUT) 145, which consists for example of a monitor and a printer. A network interface card (NIC) 150 is plugged into an expansion slot of the bus 105; the NIC 150 is used to connect the computer 100 to a network 155.

Similar considerations apply if the computer includes different units (such as a scanner or a web-cam), if the computer has a different structure (for example with a multi-processor architecture or with a cross-bar unit), if the NIC is plugged into a PCMCIA slot, if the NIC is plugged into a parallel port of the bus, and the like.

Figure 2:
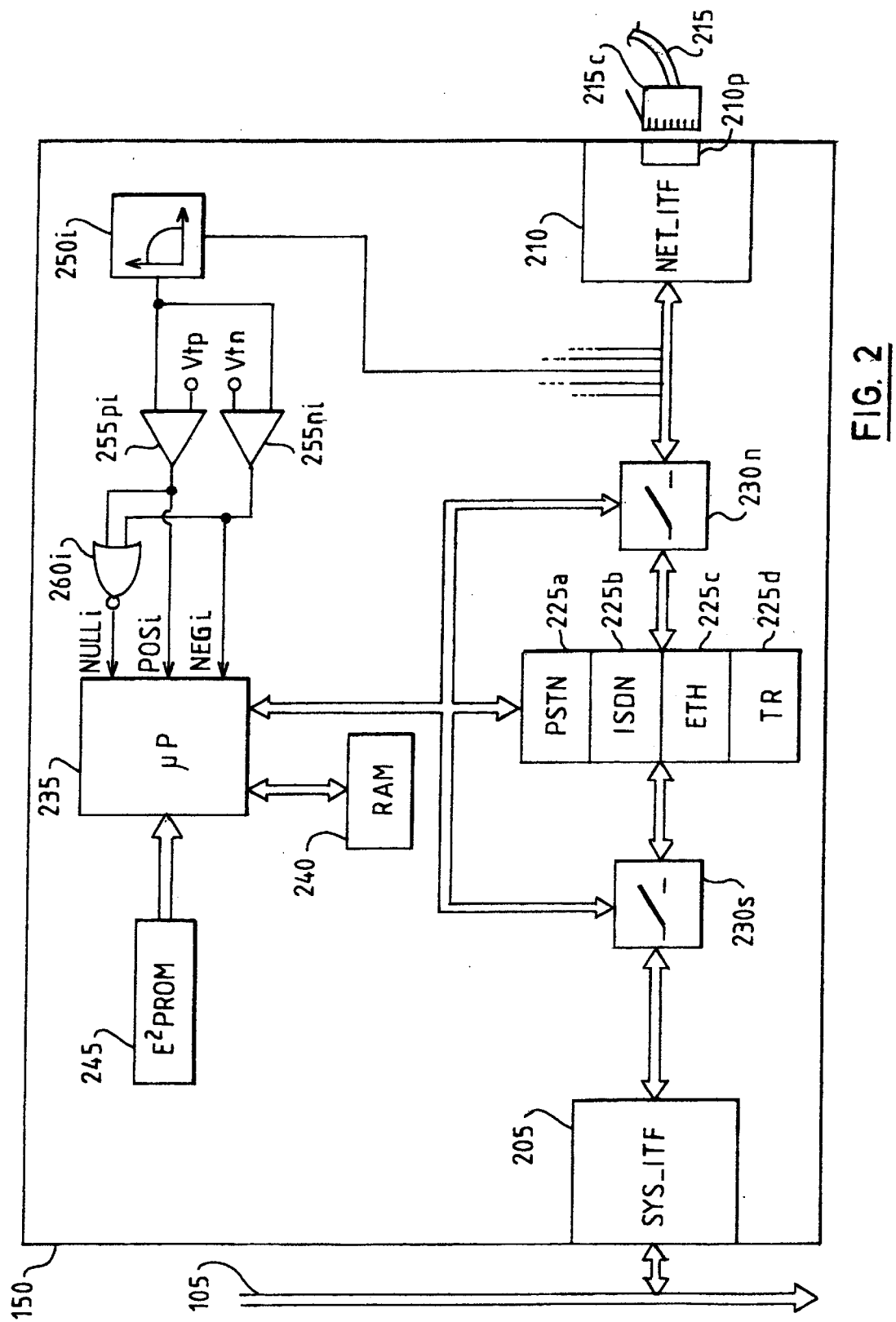
FIG. 2 is a basic block diagram of the network interface device.

Considering now FIG. 2, the NIC 150 has a system interface (SYS_ITF) 205 for connection to the bus 105 (for example of the PCI type). Particularly, the system interface 205 controls the transmission of information on the bus 105 (according to its protocol and timing), operates as a buffer memory for storing information received from or to be transmitted onto the bus, and so on.

On the other hand, a network interface (NET_ITF) 210 is used to connect the NIC 150 (and then the computer) to the network. The network interface 210 has a port 210p of the RJ-45 (Registered Jack-45) type, which consists of eight female leads (or holes). The computer is connected to the network by means of a cable 215 terminated by a RJ-45 (male) connector 215c (with eight male leads, or pins), which is plugged into the port 210p; for example, the cable 215 is a Cat-5 (Category 5) cable consisting of four twisted pairs of copper wires.

The NIC 150 includes several functional blocks (four in the example shown in the figure), each one operating the NIC 150 according to a different type of network. Particularly, a functional block 225a is used for a network of the PSTN (Public Switched Telephone Network) type, a functional block 225b is used for a network of the ISDN (Integrated Services Digital Network) type, a functional block 225c is used for an Ethernet or Fast Ethernet (100Base-T) network, and a functional block 225d is used for a Token-ring network.

The functional blocks 225a–225d perform the operations necessary to transmit and receive information from the network. Each functional block 225–225d includes different units according to the type of network, such as transceivers, a PLL (Phase Locked Loop), an encoder/decoder, a MODEM (MOdulator DEModulator), a media access controller (for processing transmitted frames), and the like.

Each type of network uses a corresponding set of active leads of the port 210p; the signals transmitted on each active lead (for example from a telephone exchange, a router, a switch, or a hub) have a fixed polarity (positive or negative). Particularly, the pin-out and the polarity of the signals used in a PSTN network are defined by the following table:

| Pin | Meaning | Polarity |
| --- | --- | --- |
| 1 | | |
| 2 | | |
| 3 | RX | + |
| 4 | TX | + |
| 5 | | |
| 6 | | |
| 7 | | |
| 8 | | | wherein the signals on the active leads (3 and 4) typically have a value of 4–10V. In an ISDN network the pin-out and the polarity of the signals are as follows:

| Pin | Meaning | Polarity |
| --- | --- | --- |
| 1 | | |
| 2 | | |
| 3 | TX/RX | + |
| 4 | RX/TX | + |
| 5 | RX/TX | − |
| 6 | TX/RX | − |
| 7 | | |
| 8 | | | wherein the signals on the active leads (3, 4, 5, and 6) have a value of ±0.833V and ±2.5V; information are transmitted on the leads 3,6 and received on the leads 4,5 in layer 1 aspects of TE1, TA and NT functional groups (applying to ISDN BRI S/T WAN devices), while information are transmitted on the leads 4,5 and received on the leads 3,6 in layer 1 aspects of NT1 and NT2 functional groups.

The pin-out and the polarity of the signals used in a Ethernet or Fast Ethernet network are:

| Pin | Meaning | Polarity |
| --- | --- | --- |
| 1 | TX | + |
| 2 | TX | − |
| 3 | RX | + |
| 4 | | |
| 5 | | |
| 6 | RX | − |
| 7 | | |
| 8 | | | wherein the signals on the active leads (1, 2, 3 and 6) have a value of ±0.85V.

At the end, in a Token-ring network the pin-out and the polarity of the signals are:

wherein the signals on the active leads (3, 4, 5, and 6) have a value of ±4.5V.

The NIC 150 additionally includes a set of switches 230s which selectively connect the system interface 205 to one of the functional blocks 225a–225d. A further set of switches 230n are used to selectively connect each functional block 225a–225d to the corresponding active leads of the port 210p. Particularly, the lead 1 can be connected to a corresponding terminal of the functional block 225c, the lead 2 can be connected to a corresponding terminal of the functional block 225c, the lead 3 can be connected to a corresponding terminal of the functional blocks 225a–225d, the lead 4 can be connected to a corresponding terminal of the functional blocks 225a, 225b and 225d, the lead 5 can be connected to a corresponding terminal of the functional blocks 225b–225d, and the lead 6 can be connected to a corresponding terminal of the functional blocks 225b–225d.

A microprocessor (mP) 235 controls the functional blocks 225a–225d and the switch sets 230s,230n; a working memory (RAM) 240 is used by the microprocessor 235, and a non-volatile memory (typically an $E^2PROM$) 245 stores a program controlling the operation of the microprocessor 235. Each i-th lead of the port 210p on which a signal can be present (i=1 . . . 6 in the example at issue) is connected to a low-pass filter 250i (consisting for example of a resistor and a capacitor), which outputs a direct-voltage component of the signal on the lead.

This direct-voltage component is supplied to the non-inverting input of a comparator 225pi and to the inverting input of a comparator 225ni. The inverting input of the comparator 225pi is set to a positive threshold value Vtp substantially lower than any signal which can be transmitted in all the types of network which are supported by the NIC 150 (for example +0.4V); similarly, the non-inverting input of the comparator 225ni is set to a negative threshold value Vtn substantially lower (in absolute value) than any signal which can be transmitted in all the supported types of network (for example −0.4V).

The comparator 255pi outputs a signal POSi and the comparator 225ni outputs a signal NEGi which are provided to the microprocessor 235. The signals POSi and NEGi are also applied to corresponding inputs of a logic NAND gate 260i; the NAND gate 260i outputs a signal NULLi, which is also supplied to the microprocessor 235. In this way, the filter 250i cancels any alternate component of the voltage on each lead. If the corresponding direct-voltage component is higher than the positive threshold value Vtp (i.e, it has a positive polarity) the signal POSi is asserted, whereas if the corresponding direct-voltage component is lower than the negative threshold value Vtn (i.e, it has a negative polarity) the signal NEGi is asserted. If the direct-voltage component is in the range between Vtn and Vtp (i.e., no signal is present on the lead), the signals POSi and NEGi are both deasserted; as a consequence, the signal NULLi (output by the NAND gate 260i) is asserted.

Likewise considerations apply is the bus of the computer is of a different type (such as an ISA, EISA or MCA bus), if a different cable and a different connector are used (such as a coaxial cable, a fibre optic cable, or a BNC connector), if the functional blocks are in a different number (even only two) and of different types (such as for a FDDI or an ATM network), and so on.

Figure 3:
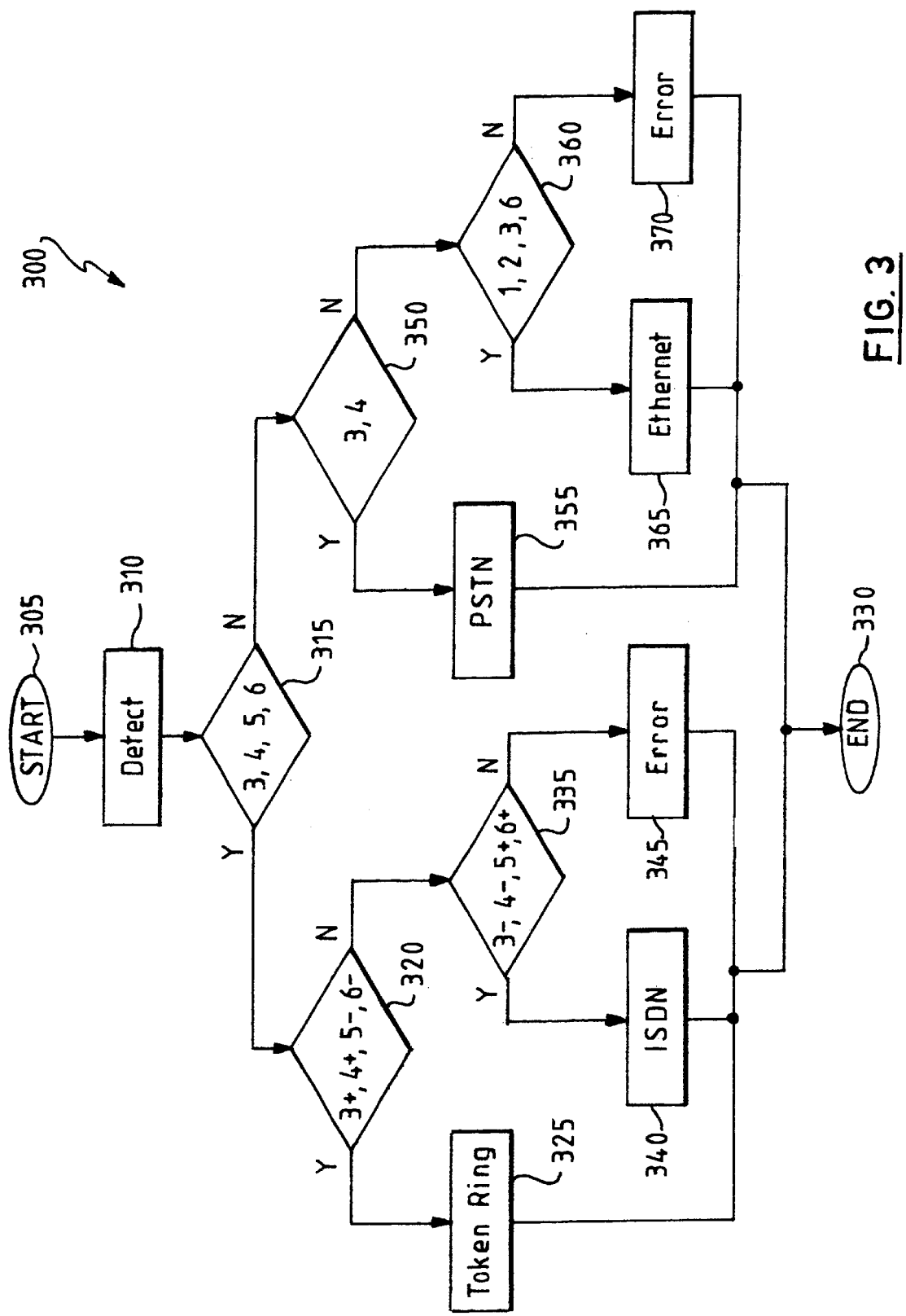
FIG. 3 depicts a flow chart of a method used for automatically configuring the network interface device.

With reference now to FIG. 3 (together with FIG. 2), each time the computer is powered on, the microprocessor 235 runs the control program stored on the non-volatile memory 245. This program performs a method 300 which starts at block 305 and then goes to block 310, wherein the microprocessor 235 detects the signals POSi, NEGi and NULLi associated with each lead of the port 210p.

The method checks at block 315 whether a signal is present on the leads 3, 4, 5 and 6. If so (signals NULL3, NULL4, NULL5 and NULL6 all deasserted), the method proceeds to block 320, wherein it is checked whether the signals on the leads 3 and 4 have a positive polarity and the signals on the leads 5 and 6 have a negative polarity. If yes (signals POS3, POS4, NEG5 and NEG6 all asserted), the computer is attached to a Token-ring network, and the method descends into block 325, wherein the microprocessor 235 activates the corresponding functional block 225d (for example connecting the same to a power supply or asserting a respective enabling signal) and controls the switch sets 230s and 230n accordingly; the method then ends at the final block 330.

On the contrary, the method goes to block 335, wherein it is checked whether the signals on the leads 3 and 4 have a negative polarity and the signals on the leads 5 and 6 have a positive polarity. If yes (signals NEG3, NEG4, POS5 and POS6 all asserted), the computer is attached to an ISDN network, and the method descends into block 340 for activating the corresponding functional block 225b and controlling the switch sets 230s and 230n accordingly; on the contrary, the computer is not attached to any type of network supported by the NIC 150, and the method enters an error condition at block 345 (for example with a corresponding warning massage displayed on the monitor of the computer). In both cases, the method passes to the final block 330.

Referring back to block 315, if a signal is not present on all the leads 3, 4, 5 and 6 the method enters decisional block 350 and checks whether a signal is present on leads 3 and 4. If so (signals NULL3 and NULL4 both deasserted), the computer is attached to a PSTN network, and the method descends into block 355 for activating the corresponding functional block 225a (and controlling the switch sets 230s and 230n accordingly); the method then ends at the final block 330.

Conversely, the method continues to block 360, wherein it is checked whether a signal is present on the leads 1, 2, 3 and 6. If so (signals NULL1, NULL2, NULL3 and NULL6 all deasserted), the computer is attached to an Ethernet/Fast Ethernet network, and the method descends into block 365 for activating the corresponding functional block 225c (and controlling the switch sets 230s and 230n accordingly); on the contrary, the computer is not attached to any type of network supported by the NIC 150, and the method enters an error condition at block 370. In both cases, the method ends at the final block 330.

Likewise considerations apply if the program implements an equivalent method, for example with status messages, with diagnostic messages, or even without entering any error condition.

More generally, in the present invention the NIC includes logic means for detecting if a signal is present on each lead and for determining the type of network corresponding to the present signals, and configuration means for activating the functional block corresponding to the determined type of network.

The solution of the invention eliminates the need of different NICs for different types of network. Only a single NIC (with a single cable) can be used to connect the computer to several types of network; moreover, this allows slots of the computers to be saved. The above described result is obtained with a very simple structure, which does not require multiple ports.

Each time the computer has to be inserted into a network, it is enough to plug the cable into the port of the NIC, without having to pay any attention to the type of network; the NIC automatically configures itself without any risk of error.

The preferred embodiment of the present invention described above offers further advantages. Particularly, detecting the polarity of the signals (in addition to their presence) allows the NIC to be used with substantially all the types of network which are commercially available. In any case, in a simpler embodiment of the invention, the NIC only detects if a signal is present on each lead (for example in a NIC which does not support a Token-ring network).

The switch sets for connecting the activated functional block to the system interface and to the network interface are very simple and fast. The microprocessor controlling the configuration of the NIC provides a structure which is particularly flexible. Moreover, the two comparators (with respective low-pass filters) associated with each lead makes the system very precise.

Alternatively, the functional blocks are activated and are connected to the system and network interfaces in a different manner (for example with a bus structure), the program controlling the configuration of the NIC is run under the control of the CPU of the computer, the configuration of the NIC is implemented in hardware, different means are provided for detecting the presence of a signal and its polarity (for example a single zero comparator for each lead), and the like.

Naturally, in order to satisfy local and specific requirements, a person skilled in the art may apply to the solution described above many modifications and alterations all of which, however, are included within the scope of protection of the invention as defined by the following claims.

What is claimed is:

1. A network interface device for connecting a computer to a network including a port with a plurality of loads for a network communications link and a plurality of functional blocks each one for operating the device according to a different type of network, each type of network being identified a corresponding set of active leads, logic means for detecting if a signal is present on each lead and for determining the type of network corresponding to the present signals, wherein the logic means includes, for each lead, a low-pass filter for obtaining a direct-voltage component of a voltage on the lead, a first comparator for asserting a positive indicator signal when the direct-voltage component is higher than a positive threshold value, a second comparator for asserting a negative indicator signal when the direct-voltage component is lower than a negative threshold value, and means for asserting a null indicator signal when both the positive indicator signal and the negative indicator signal are deasserted, and configuration means including a microprocessor and a memory for storing a program controlling the microprocessor for activating the functional block corresponding to the determined type of network, the microprocessor determining the type of network according to the positive indicator signal, the negative indicator signal, and the null indicator signal corresponding to each lead.

2. The device according to claim 1, wherein each type of network is further identified by a corresponding polarity of the active leads and wherein the logic means further detects the polarity of each present signal and determines the type of network corresponding to the present signals and the detected polarity of the present signals.

3. The device according to claim 2, wherein the port is of a RJ45 type with eight leads and wherein the plurality of functional blocks consists of a first functional block for a PSTN network, a second functional block for an ISDN network, a third functional block for an Ethernet network and a fourth functional block for a Token-ring network.

4. The device according to claim 1, further including a system interface for a bus of the computer, the configuration means including a first plurality of switches for selectively connecting the system interface to the activated functional block and a second plurality of switches for selectively connecting the activated functional block to the corresponding active leads.

* * * * *